(12) United States Patent
Zhang et al.

(10) Patent No.: US 10,887,846 B2
(45) Date of Patent: *Jan. 5, 2021

(54) UPLINK TRANSMISSION POWER CONTROL METHOD AND USER EQUIPMENT

(71) Applicant: Huawei Technologies Co., Ltd., Shenzhen (CN)

(72) Inventors: Xingwei Zhang, Beijing (CN); Junren Chang, Beijing (CN); Yuhua Chen, Shenzhen (CN); Xiaoan Fan, Beijing (CN); Bo Li, Beijing (CN); Yan Cheng, Beijing (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,299

(22) Filed: Aug. 3, 2017

(65) Prior Publication Data

US 2017/0332332 A1 Nov. 16, 2017

Related U.S. Application Data

(63) Continuation of application No. 14/309,579, filed on Jun. 19, 2014, now Pat. No. 9,756,581, which is a (Continued)

(30) Foreign Application Priority Data

Dec. 19, 2011 (CN) .......................... 2011 1 0426330

(51) Int. Cl.
*H04W 52/30* (2009.01)
*H04W 52/34* (2009.01)
(Continued)

(52) U.S. Cl.
CPC ......... *H04W 52/30* (2013.01); *H04W 52/146* (2013.01); *H04W 52/346* (2013.01);
(Continued)

(58) Field of Classification Search
CPC ............. H04W 52/367; H04W 52/146; H04W 74/0833; H04W 52/40; H04L 5/14
See application file for complete search history.

(56) References Cited

U.S. PATENT DOCUMENTS

2006/0252450 A1 11/2006 Wigard et al.
2010/0029318 A1 2/2010 Tano et al.
(Continued)

FOREIGN PATENT DOCUMENTS

| CN | 101513106 A | 8/2009 |
| CN | 101527593 A | 9/2009 |

(Continued)

OTHER PUBLICATIONS

"Simultaneous transmission of multiple uplink channels in LTE-A Rel-11," 3GPP TSG RAN WG1 Meeting #67, San Francisco, USA, R1-113721, 3rd Generation Partnership Project, Valbonne, France (Nov. 14-18, 2011).

(Continued)

*Primary Examiner* — Jung H Park
(74) *Attorney, Agent, or Firm* — Leydig, Voit & Mayer, Ltd.

(57) ABSTRACT

An uplink transmission power control method and a user equipment are provided, where the method includes: determining, by a UE, whether uplink channels are simultaneously transmitted over adjacent subframes between multiple carriers; where the adjacent subframes between the multiple carriers are partially overlapped; and timing advance values of the multiple carriers are different; and if uplink channels are simultaneously transmitted over adjacent subframes
(Continued)

between multiple carriers, processing, by the user equipment, an uplink channel transmitted over the last symbol on a partially overlapped subframe of another carrier except a carrier having the greatest timing advance value, so that total transmission power of the uplink channels is lower than the maximum transmission power or an interference level of the user equipment.

12 Claims, 3 Drawing Sheets

Related U.S. Application Data continuation of application No. PCT/CN2012/085401, filed on Nov. 28, 2012.

(51) Int. Cl.
*H04W 52/36* (2009.01)
*H04W 52/14* (2009.01)
*H04W 72/04* (2009.01)
*H04W 52/24* (2009.01)

(52) U.S. Cl.
CPC ..... *H04W 52/367* (2013.01); *H04W 72/0473* (2013.01); *H04W 52/243* (2013.01); *H04W 52/365* (2013.01)

(56) References Cited

U.S. PATENT DOCUMENTS

| 2011/0190024 | A1 | 8/2011 | Seong et al. |
| 2013/0114505 | A1* | 5/2013 | Haim ................. H04W 52/146 370/328 |
| 2015/0304967 | A1 | 10/2015 | Kim et al. |

FOREIGN PATENT DOCUMENTS

| CN | 102238716 | A | | 11/2011 | |
| CN | 102378341 | A | | 3/2012 | |
| CN | 102572967 | A | | 7/2012 | |
| CN | 102573030 | A | | 7/2012 | |
| EP | 1878131 | A2 | | 1/2008 | |
| WO | 2005076500 | A1 | | 8/2005 | |
| WO | 2010089284 | A2 | | 8/2010 | |
| WO | 2010091425 | A2 | | 8/2010 | |
| WO | 2011085646 | A1 | | 7/2011 | |
| WO | 2011120716 | A1 | | 10/2011 | |
| WO | 2011122910 | A2 | | 10/2011 | |
| WO | 2013067430 | A1 | | 5/2013 | |
| WO | WO2013067430 | | * | 5/2013 | .......... H04W 52/146 |

OTHER PUBLICATIONS

"Issues on UL Simultaneous Transmission for Multiple TA," 3GPP TSG RAN WG1 Meeting #67, San Francisco, USA, R1-114070, 3rd Generation Partnership Project, Valbonne, France (Nov. 14-18, 2011).

"Remaining Open Issues on Simultaneous PUCCH/PUSCH/SRS Transmission," 3GPP TSG RAN WG1 Meeting #63bis, Dublin, Ireland, R1-110414, 3rd Generation Partnership Project, Valbonne, France (Jan. 17-21, 2011).

"3rd Generation Partnership Project; Technical Specification Group Radio Access Network; Evolved Universal Terrestrial Radio Access (E-UTRA); Physical layer procedures (Release 11)," 3GPP TS 36.213, V11.3.0, pp. 1-176, 3rd Generation Partnership Project, Valbonne, France (Jun. 2013).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.4.0, pp. 1-101, 3rd Generation Partnership Project, Valbonne, France (Dec. 2011).

"Remaining details of PUSCH/PUCCH/SRS simultaneous transmissions in Rel. 10," 3GPP TSG RAN WG1 Meeting #63bis, Dublin, Ireland, R1-110197, 3rd Generation Partnership Project, Valbonne, France (Jan. 17-21, 2011).

"Aspect on Simultaneous Transmission of PRACH and UL Channels considering Multiple Timing Advance," 3GPP TSG RAN WG1 Meeting #67, San Francisco, USA, R1-113910, 3rd Generation Partnership Project, Valbonne, France (Nov. 14-18, 2011).

"3rd Generation Partnership Project;Technical Specification Group Radio Access Network; Evolved Universal Terrestrial Radio Access (E-UTRA); Physical layer procedures (Release 10)," 3GPP TS 36.213 V10.4.0, pp. 1-125, 3rd Generation Partnership Project, Valbonne, France (Dec. 2011).

"3rd Generation Partnership Project; Technical Specification Group Radio Access Network; Evolved Universal Terrestrial Radio Access (E-UTRA); User Equipment (UE) radio transmission and reception (Release 10)," 3GPP TS 36.101 V10.4.0 pp. 1-242, 3rd Generation Partnership Project, Valbonne, France (Sep. 2011).

* cited by examiner

UPLINK TRANSMISSION POWER CONTROL METHOD AND USER EQUIPMENT

CROSS-REFERENCE TO RELATED APPLICATIONS

This application is a continuation of U.S. patent application Ser. No. 14/309,579, filed on Jun. 19, 2014 (and issued as U.S. Pat. No. 9,756,581 on Sep. 5, 2017), which is a continuation of International Patent Application No. PCT/CN2012/085401, filed on Nov. 28, 2012, which claims priority to Chinese Patent Application No. 201110426330.3, filed on Dec. 19, 2011. The disclosures of the aforementioned applications are hereby incorporated by reference in their entireties.

TECHNICAL FIELD

The present invention relates to the field of communications technologies, and in particular, to an uplink transmission power control method and a user equipment.

BACKGROUND

In the long term evolution-advanced (Long Term Evolution-Advanced, LTE-A) R11 version, different carriers (including a primary carrier, and the rest is a secondary carrier) supported by a user equipment (User Equipment, UE) are allowed to have different timing advance (Timing Advance, TA) values. The UE may obtain, according to a TA value of a carrier, time advance amount required for sending an uplink channel through the carrier, so that the time when the uplink channel sent through the carrier arrives at a base station (Evolved Node B, ENB) is consistent with a preset time of the ENB, thereby completing uplink transmission synchronization of the UE, and further the UE may be scheduled by the ENB for uplink transmission.

In an actual application, carriers may be grouped into different timing advance groups (Timing Advance Group, TAG) according to different TA values of the carriers, and TA values of carriers in each TAG are the same. Because TA values of carriers of different TAGs are different, when the UE sends an uplink channel through carrier 1 and carrier 2 that have different TAGs, partial overlapping may occur between subframe n of carrier 1 and adjacent subframe n+1 of carrier 2 as shown in FIG. 1. In the overlapped area (which is about one symbol), there may occur that uplink transmission power of the UE exceeds the maximum transmission power of the UE, which results in a power limitation, or uplink transmission power of the UE may reach an interference level, which results in an interference limitation.

SUMMARY

Embodiments of the present invention provide an uplink transmission power control method and a user equipment, which are used to coordinate and control uplink transmission power of the UE when the UE sends uplink channels through carriers of different TAGs.

An uplink transmission power control method includes:

determining, by a user equipment, whether uplink channels are simultaneously transmitted over adjacent subframes between multiple carriers; where the adjacent subframes between the multiple carriers are partially overlapped; and timing advance values of the multiple carriers are different; and if uplink channels are simultaneously transmitted over adjacent subframes between multiple carriers, processing, by the user equipment, an uplink channel transmitted over the last symbol on a partially overlapped subframe of another carrier except a carrier having the greatest timing advance value, so that total transmission power of the uplink channels is lower than the maximum transmission power or an interference level of the user equipment.

A user equipment includes:

a first determining unit, configured to determine whether uplink channels are simultaneously transmitted over adjacent subframes between multiple carriers; where the adjacent subframes between the multiple carriers are partially overlapped; and timing advance values of the multiple carriers are different; and a processing unit, configured to, when a determining result of the first determining unit is yes, process an uplink channel transmitted over the last symbol on a partially overlapped subframe of another carrier except a carrier having the greatest timing advance value, so that total transmission power of the uplink channels is lower than the maximum transmission power or an interference level of the user equipment.

In the embodiments of the present invention, when a UE determines that uplink channels are simultaneously transmitted over adjacent subframes on carriers of different TA values (that is, between carriers of different TAGs), the UE may process an uplink channel transmitted over the last symbol on a partially overlapped subframe of another carrier except a carrier having the greatest TA value, so that total transmission power of the uplink channels on adjacent subframes between carriers of different TAs is lower than the maximum transmission power or an interference level of the UE. Therefore, when the UE sends the uplink channels through the carriers of different TAGs and the adjacent subframes between the carriers of different TAGs are partially overlapped, uplink transmission power of the UE may be prevented from exceeding the maximum transmission power of the UE, or uplink transmission power of the UE may be prevented from reaching an interference level.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention provide an uplink transmission power control method and a user equipment. When the UE sends uplink channels through carriers of different TAGs and adjacent subframes between the carriers of different TAGs are partially overlapped, uplink transmission power of the UE may be prevented from exceeding the maximum transmission power of the UE, or uplink transmission power of the UE may be prevented from reaching an interference level. The following is the detailed description.

Embodiment 1

Figure 2:
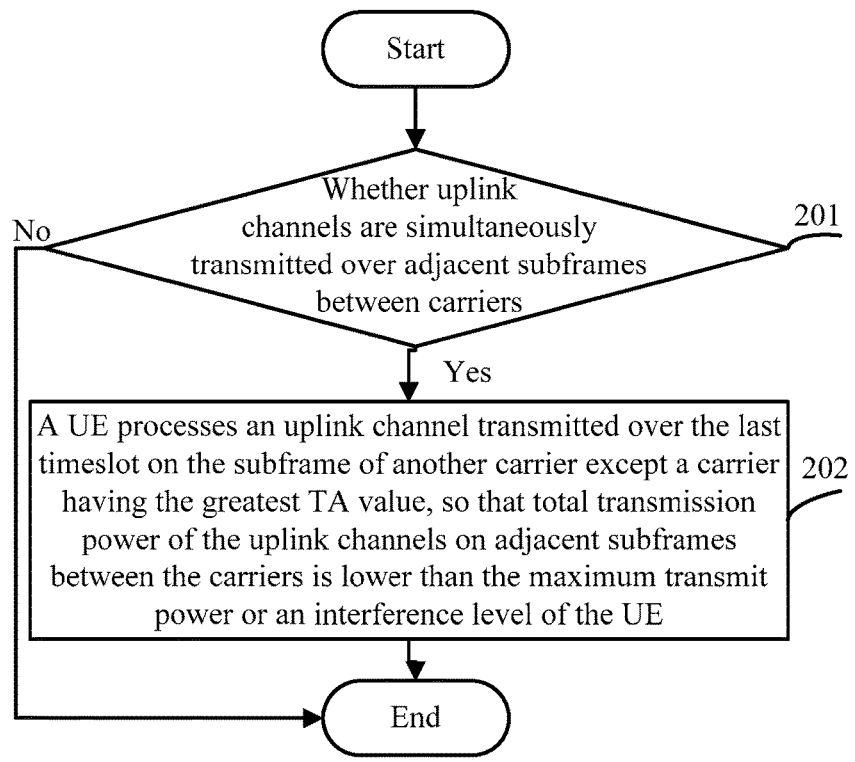
FIG. 2 is a flow chart of an uplink transmission power control method according to an embodiment of the present invention.

Refer to FIG. 2. FIG. 2 is a flow chart of an uplink transmission power control method according to Embodiment 1 of the present invention. As shown in FIG. 2, the method may include the following steps:

201. A UE determines whether uplink channels are simultaneously transmitted over adjacent subframes between carriers; where the adjacent subframes between the carriers are partially overlapped, the overlapped area is smaller than or equal to one symbol; and each carrier between the carriers has a different TA value; if yes, perform step 202; if no, end the procedure.

In this embodiment of the present invention, carriers having different TA values may be carriers of different TAGs. The TA values of carriers of different TAGs are different.

In this embodiment of the present invention, the foregoing uplink channel may be a physical uplink control channel (Physical Uplink Control Channel, PUCCH), a physical uplink shared channel (Physical Uplink Shared Channel, PUSCH), a sounding reference signal (Sounding Reference Signal, SRS) or a physical random access channel (Physical Random Access Channel, PRACH), which is not specifically limited in this embodiment of the present invention.

In this embodiment of the present invention, if uplink channels are simultaneously transmitted over adjacent subframes between carriers having different TA values, the adjacent subframes between carriers having different TA values will be partially overlapped, and the overlapped area is smaller than or equal to one symbol. For example, it is assumed that a radius of a cell is 10 km (10 km is a common maximum radius of a cell), and carrier 1 and carrier 2 that simultaneously serve a UE come from a macro base station (Marco ENB) and a micro base station (Pico ENB) in the cell, respectively. The micro base station is at an edge of the cell covered by the macro base station, and the distance to the UE is very close (that is, a TA value of carrier 2 is about 0), the maximum TA difference between carrier 1 and carrier 2 is the time from the macro base station to the UE $(10*10\wedge 3)/(3*10\wedge 8)=33.33$ us, and a duration of one symbol in a standard is $1/14=71$ us. It can be seen that the overlapped area in FIG. 1 does not exceed one symbol.

When uplink channels are simultaneously transmitted over adjacent subframes between multiple carriers having different TA values, an objective law will exist that the adjacent subframes between multiple carriers will be partially overlapped, and the overlapped area is smaller than or equal to one symbol. The symbol described in this embodiment of the present invention is an orthogonal frequency division multiplexing (Orthogonal Frequency Division Multiplexing, OFDM) symbol.

202. The UE processes an uplink channel transmitted over the last symbol on the subframe of another carrier except a carrier having the greatest TA value, so that total transmission power of the uplink channels on the adjacent subframes between the carriers is lower than the maximum transmission power or an interference level of the UE.

In this embodiment of the present invention, an interference level is also represented in the form of power. When the total transmission power of the uplink channels is lower than the interference level, it indicates that interference from the uplink channels to another neighboring cell is relatively small. Otherwise, it indicates that interference from the uplink channels to another neighboring cell is relatively great. The interference level can be set by a person skilled in the field according to an actual condition.

Figure 1:
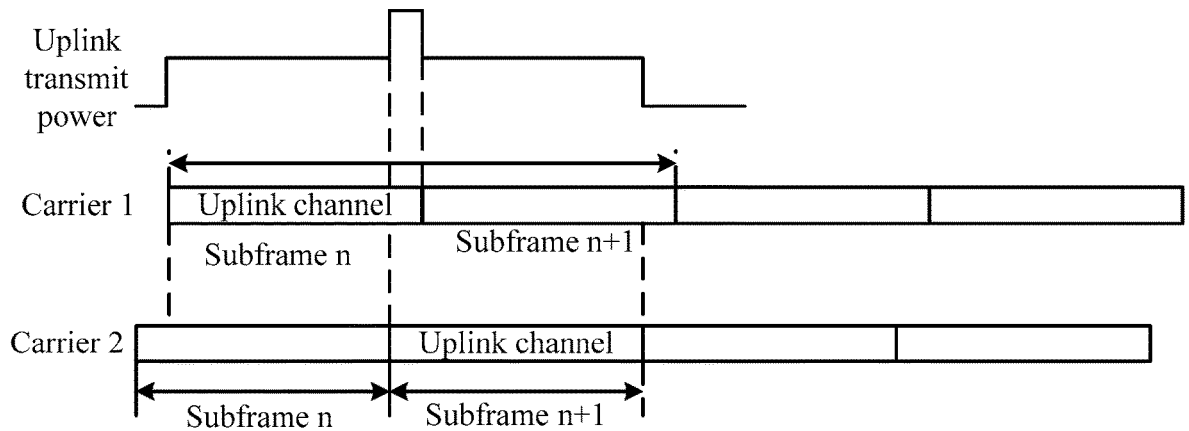
FIG. 1 is schematic diagram illustrating partial overlapping of adjacent subframes between carrier 1 and carrier 2 of different TA values.

Use carrier 1 and carrier 2 shown in FIG. 1 as an example. An absolute value of a TA value of carrier 1 is smaller than an absolute value of a TA value of carrier 2. When a signal of subframe n of carrier 2 is sent and a signal of subframe n+1 starts to be sent, carrier 1 is still sending the signal of subframe n, a carrier having the greatest TA value refers to a carrier having a TA value whose absolute value is the greatest. In FIG. 1, a carrier having the TA value whose absolute value is the greatest is carrier 2. The UE may process an uplink channel transmitted over the last symbol on a subframe, such as subframe n of carrier 1 (subframe n of carrier 1 is partially overlapped with subframe n+1 of carrier 2) of another carrier except carrier 2 that has the greatest TA value, so that the total transmission power of uplink channels on subframe n of carrier 1 and subframe n+1 of carrier 2 is lower than the maximum transmission power or an interference level of the UE. In FIG. 1, a carrier having the greatest TA value is carrier 2; and the subframe of the another carrier except the carrier having the greatest TA value is subframe n of carrier 1.

In a possible implementation manner, the UE may subtract uplink channel transmission power of the carrier having the greatest TA value from the maximum transmission power of the UE so as to obtain power headroom, and use the power headroom as transmission power of the uplink channel transmitted over the last symbol on the subframe of the another carrier except the carrier having the greatest TA value, so that the total transmission power of the uplink channels on the adjacent subframes between the carriers is lower than the maximum transmission power or an interference level of the UE; where the number of the carriers having different TA values may be specifically two.

Alternatively, in another possible implementation manner, the UE may equally allocate the power headroom to the uplink channel transmitted over the last symbol on the subframe of the another carrier except the carrier having the greatest TA value, so that the total transmission power of the uplink channels on the adjacent subframes between the carriers is lower than the maximum transmission power or an interference level of the UE; where the number of the carriers having different UE values is more than two.

Use carrier 1 and carrier 2 shown in FIG. 1 as an example. The UE may subtract uplink channel transmission power of carrier 2 from the maximum transmission power of the UE so as to obtain power headroom, and use the power headroom as transmission power of the uplink channel transmitted over the last symbol on subframe n of carrier 1, so that the total transmission power of the uplink channels on subframe n of carrier 1 and subframe n+1 of carrier 2 is lower than the maximum transmission power or an interference level of the UE.

In a possible implementation manner, the UE may drop the uplink channel transmitted over the last symbol on the subframe of the another carrier except the carrier having the greatest TA value so that the total transmission power of the uplink channels on the adjacent subframes between the carriers is lower than the maximum transmission power or an interference level of the UE; where the uplink channel on the subframe of the another carrier includes any one of the following: an SRS, the last symbol of a PUCCH, the last symbol of a PUSCH, and the like.

Use carrier 1 and carrier 2 shown in FIG. 1 as an example. If the uplink channel on subframe n of carrier 1 is an SRS, the UE may drop the uplink channel transmitted over the last symbol on subframe n on carrier 1, so that the total transmission power of the uplink channels on subframe n of carrier 1 and subframe n+1 of carrier 2 is lower than the maximum transmission power or an interference level of the UE.

In a possible implementation manner, the UE may used a shortened uplink channel transmission format on the subframe of the another carrier except the carrier having the greatest TA value so that transmission over the last symbol on the subframe is null and so that the total transmission power of the uplink channels on the adjacent subframes between the carriers is lower than the maximum transmission power or an interference level of the UE; where the uplink channel on the subframe of the another carrier is a PUCCH.

Use carrier 1 and carrier 2 shown in FIG. 1 as an example. If the uplink channel on subframe n of carrier 1 is a PUCCH, the UE may use a shortened PUCCH format on subframe n of carrier 1, so that transmission over the last symbol on subframe n of carrier 1 is null and so that the total transmission power of the uplink channels on subframe n of carrier 1 and subframe n+1 of carrier 2 is lower than the maximum transmission power or an interference level of the UE.

In a possible implementation manner, the UE may match a rate of an uplink channel on the subframe of the another carrier except the carrier having the greatest TA value so that transmission over the last symbol on the subframe is null and so that the total transmission power of the uplink channels on the adjacent subframes between the carriers is lower than the maximum transmission power or an interference level of the UE; where the uplink channel on the subframe of the another carrier is a PUSCH.

Use carrier 1 and carrier 2 shown in FIG. 1 as an example. If the uplink channel on subframe n of carrier 1 is a PUSCH, the UE may match a rate of an uplink channel on subframe n of carrier 1, so that transmission over the last symbol on subframe n of carrier 1 is null and so that the total transmission power of the uplink channels on subframe n of carrier 1 and subframe n+1 of carrier 2 is lower than the maximum transmission power or an interference level of the UE.

In a possible implementation manner, the UE may drop the uplink channel transmitted over the last symbol on the subframe of the another carrier except the carrier having the greatest TA value so that the total transmission power of the uplink channels on the adjacent subframes between the carriers is lower than the maximum transmission power or an interference level of the UE; where the uplink channel on the subframe of the another carrier is a PRACH, and the subframe of the another carrier is not the last subframe used to transmit a preamble.

Use carrier 1 and carrier 2 shown in FIG. 1 as an example. If the uplink channel on subframe n of carrier 1 is a PRACH, the preamble (preamble) sent by the UE over the PRACH may occupy 1-3 subframes. If subframe n of carrier 1 is not the last subframe where the UE sends the preamble, the PRACH transmitted over the last symbol on subframe n of carrier 1 may be dropped, so that the total transmission power of the uplink channels on subframe n of carrier 1 and subframe n+1 of carrier 2 is lower than the maximum transmission power or an interference level of the UE. If subframe n of carrier 1 is the last subframe where the UE sends the preamble, the PRACH transmitted over the last symbol on subframe n of carrier 1 does not need to be processed, because the preamble does not occupy the whole PRACH resource and the last symbol on subframe n of carrier 1 is within the scope of a guard band.

In Embodiment 1 of the present invention, when a UE sends uplink channels through carriers of different TAGs and adjacent subframes between the carriers of different TAGs are partially overlapped, uplink transmission power of the UE may be prevented from exceeding the maximum transmission power of the UE and resulting in a power limitation, or uplink transmission power of the UE may be prevented from reaching an interference level and resulting in an interference limitation.

Embodiment 2

Figure 3:
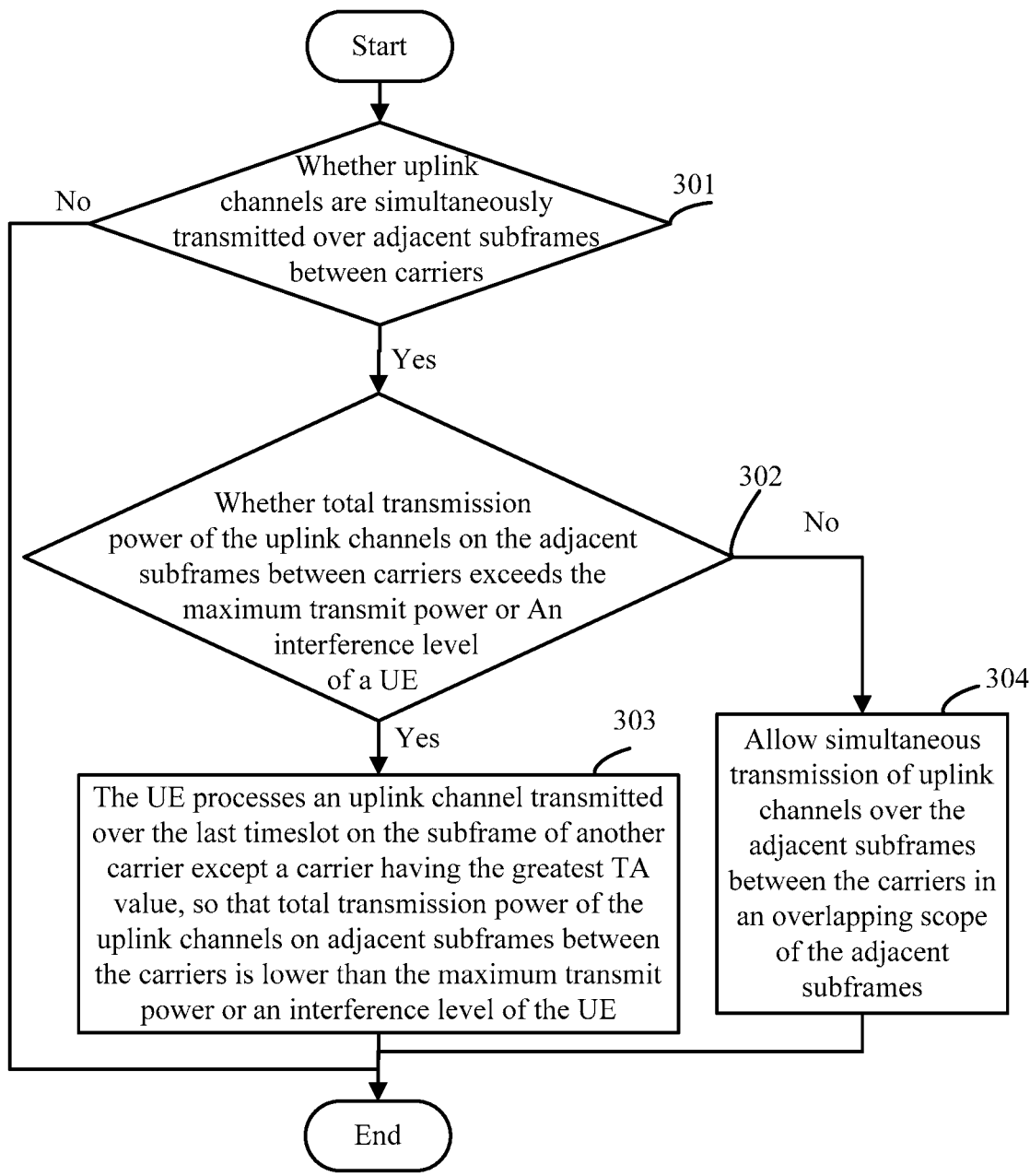
FIG. 3 is a flow chart of another uplink transmission power control method according to an embodiment of the present invention.

Refer to FIG. 3. FIG. 3 is a flow chart of an uplink transmission power control method provided in Embodiment 2 of the present invention. In the foregoing Embodiment 1, total transmission power of the uplink channels on adjacent subframes between carriers having different TA values may not exceed the maximum transmission power or an interference level of the UE. If processing is performed always according to the method described in Embodiment 1, a certain degree of a uplink transmission power waste may exist. In Embodiment 2 of the present invention, the problem of the uplink transmission power waste that may be caused in Embodiment 1 may be solved. As shown in FIG. 3, the method may include the following steps:

301. The UE determines whether uplink channels are simultaneously transmitted over adjacent subframes between carriers; where the adjacent subframes between the carriers are partially overlapped, and the overlapped area is smaller than or equal to one symbol; and each carrier between the carriers has a different TA value. If yes, perform step 302; if no, end the procedure.

302. The UE determines whether the total transmission power of the uplink channels on the adjacent subframes between the carriers exceeds the maximum transmission power or an interference level of the UE. If yes, perform step 303; if no, perform step 304.

303. The UE processes an uplink channel transmitted over the last symbol on a partially overlapped subframe of another carrier except a carrier having the greatest TA value, so that the total transmission power of the uplink channels on the adjacent subframes between the carriers is lower than the maximum transmission power or an interference level of the UE.

The specific implementation manner of step 303 is described in step 202 in Embodiment 1 in detail, and is not repeated in Embodiment 2 of the present invention.

304. The UE allows simultaneous transmission of the uplink channels over the adjacent subframes between the carriers in an overlapping scope of the adjacent subframes.

In Embodiment 2 of the present invention, when a UE sends uplink channels through carriers of different TAGs and adjacent subframes between the carriers of different TAGs are partially overlapped, uplink transmission power of the UE may be prevented from exceeding the maximum transmission power of the UE and resulting in a power limitation, or uplink transmission power of the UE may be prevented from reaching an interference level and resulting in an interference limitation. In addition, in Embodiment 2 of the present invention, uplink transmission power waste may also be reduced.

The uplink transmission power control method provided in the embodiment of the present invention is described clearly and completely above. Because the UE does not notify an ENB when processing the uplink channel transmitted over the last symbol on the subframe of another carrier except a carrier having the greatest TA value, an decoding error may occur when the ENB performs decoding. In order to solve this problem, the ENB may perform the following operations: 1. The ENB respectively assumes that the UE does not process the uplink channel transmitted over the last symbol on the subframe of the another carrier except the carrier having the greatest TA value, and that the UE processes the uplink channel transmitted over the last symbol on the subframe of the another carrier except the carrier having the greatest TA value and performs decoding twice, so that the ENB may obtain correct decoding; 2. The ENB sends a NACK to the UE after the decoding error, and make the UE performs a retransmission but performance of the uplink channel may be degraded.

Embodiment 3

Figure 4:
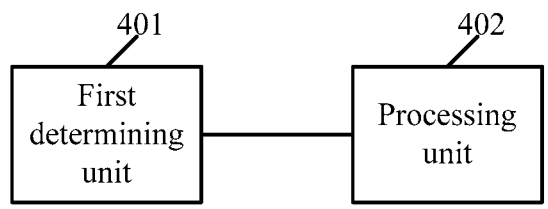
FIG. 4 is a structural diagram of a user equipment according to an embodiment of the present invention.

Refer to FIG. 4. FIG. 4 is a structural diagram of a user equipment according to Embodiment 3 of the present invention. The user equipment according to Embodiment 3 of the present invention may be a mobile phone and a handheld computer. As shown in FIG. 4, the user equipment may include:

a first determining unit 401, configured to determine whether uplink channels are simultaneously transmitted over adjacent subframes between carriers; where the adjacent subframes between the carriers are partially overlapped, and the overlapped area is smaller than or equal to one symbol; and each carrier between the carriers has a different TA value; and a processing unit 402, configured to, when a determining result of the first determining unit 401 is yes, process the uplink channel transmitted over the last symbol on the subframe of another carrier except a carrier having the greatest TA value, so that total transmission power of the uplink channels on adjacent subframes between carriers is lower than the maximum transmission power or an interference level of the user equipment.

In a possible implementation value, the processing unit 402 is specifically configured to subtract uplink channel transmission power of the carrier having the greatest TA value from the maximum transmission power of the user equipment so as to obtain power headroom, and use the power headroom as transmission power of the uplink channel transmitted over the last symbol on the subframe of the another carrier except the carrier having the greatest TA value, so that the total transmission power of the uplink channels on the adjacent subframes between the carriers is lower than the maximum transmission power or an interference level of the UE; where the number of carriers having different TA values is two.

Alternatively, the processing unit 402 is specifically configured to subtract uplink channel transmission power of the carrier having the greatest TA value from the maximum transmission power of the user equipment so as to obtain power headroom, and equally allocate the power headroom to the uplink channel transmitted over the last symbol on the subframe of the another carrier except the carrier having the greatest TA value, so that the total transmission power of the uplink channels on the adjacent subframes between the carriers is lower than the maximum transmission power or an interference level of the UE; where the number of carriers having different TA values is more than two.

In a possible implementation manner, the processing unit 402 is specifically configured to drop the uplink channel transmitted over the last symbol on the subframe of the another carrier except the carrier having the greatest TA value so that the total transmission power of the uplink channels on the adjacent subframes between the carriers is lower than the maximum transmission power or an interference level of the user equipment; where the uplink channel on the subframe of the another carrier includes any one of the following: an SRS, the last symbol on a PUCCH, the last symbol on a PUSCH, and the like.

In a possible implementation manner, the processing unit 402 is specifically configured to use a shortened uplink channel transmission format on the subframe of the another carrier except the carrier having the greatest TA value so that transmission over the last symbol on the subframe is null and so that the total transmission power of the uplink channels on the adjacent subframes between the carriers is lower than the maximum transmission power or an interference level of the user equipment; where the uplink channel on the subframe of the another carrier is a PUCCH.

In a possible implementation value, the processing unit 402 is specifically configured to match a rate of an uplink channel on the subframe of the another carrier except the carrier having the greatest TA value so that transmission over the last symbol on the subframe is null and so that the total transmission power of the uplink channels on the adjacent subframes between the carriers is lower than the maximum transmission power or an interference level of the user equipment; where the uplink channel on the subframe of the another carrier is a PUSCH.

In a possible implementation manner, the processing unit 402 is specifically configured to drop the uplink channel transmitted over the last symbol on the subframe of the another carrier except the carrier having the greatest TA value so that the total transmission power of the uplink channels on the adjacent subframes between the carriers is lower than the maximum transmission power or an interference level of the user equipment; where the uplink channel on the subframe of the another carrier is a PRACH, and the subframe of the another carrier is not the last subframe used to transmit a preamble.

With the user equipment provided in Embodiment 3 of the present invention, when the UE sends uplink channels through carriers of different TAGs and adjacent subframes between the carriers of different TAGs are partially overlapped, uplink transmission power of the UE may be prevented from exceeding the maximum transmission power of the UE and resulting in a power limitation, or uplink transmission power of the UE may be prevented from reaching an interference level and resulting in an interference limitation.

Embodiment 4

Figure 5:
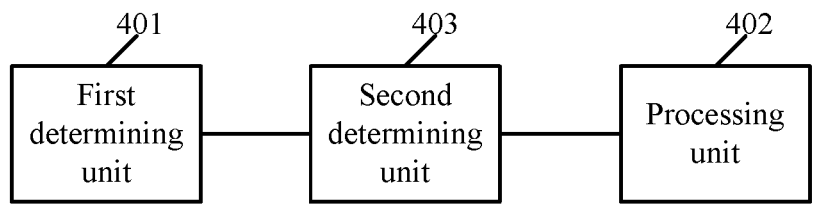
FIG. 5 is a structural diagram of another user equipment according to an embodiment of the present invention.

Refer to FIG. 5. FIG. 5 is a structural diagram of a user equipment according to Embodiment 4 of the present invention. The user equipment according to Embodiment 4 of the present invention may be obtained by optimizing the user equipment shown in FIG. 4. As shown in FIG. 5, the user equipment not only includes a first determining unit 401 and a processing unit 402, but also may include a second determining unit 403.

The second determining unit 403 is configured to, when a determining result of the first determining unit 401 is yes, determine whether total transmission power of the uplink channels on the adjacent subframes between the carriers exceeds the maximum transmission power or an interference level of the user equipment.

Correspondingly, the processing unit 402 is configured to, when the determining result of the first determining unit 403 is yes, process the uplink channel transmitted over the last symbol on the subframe of another carrier except a carrier having the greatest TA value, so that the total transmission power of the uplink channels on the adjacent subframes between the carriers is lower than the maximum transmission power or an interference level of the user equipment.

Alternatively, the processing unit is also configured to, when the determining result of the second determining unit 403 is no, allow simultaneous transmission of the uplink channels over the adjacent subframes between the carriers in an overlapping scope of the adjacent subframes.

With the user equipment provided in Embodiment 4 of the present invention, when the UE sends uplink channels through carriers of different TAGs and adjacent subframes between the carriers of different TAGs are partially overlapped, uplink transmission power of the UE may be prevented from exceeding the maximum transmission power of the UE and resulting in a power limitation, or uplink transmission power of the UE may be prevented from reaching an interference level and resulting in an interference limitation. In addition, the user equipment provided in embodiment 4 of the present invention may also reduce uplink transmission power waste.

A person of ordinary skill in the art may understand that all or a part of the steps of the methods in the foregoing embodiments may be implemented by a program instructing relevant hardware. The program may be stored in a computer readable storage medium. The storage medium may include: a flash memory, a read-only memory (Read-Only Memory, ROM), a random access memory (Random Access Memory, RAM), a magnetic disc or an optical disc.

The uplink transmission power control method and user equipment provided in the embodiments of the present invention are described above in detail. The principle and the implementation manners of the present invention are described through specific examples in this document. The description of the foregoing embodiments is merely used to help understanding the method and core ideas of the present invention. In addition, for a person skilled in the art, modifications may be made to the specific implementation manners and application scopes according to the ideas of the present invention. In conclusion, the content of the specification should not be construed as a limitation on the present invention.

What is claimed is:

1. An uplink transmission power control method, comprising:
    determining, by a user equipment, whether a total transmission power of an overlapped area exceeds a maximum transmission power of the user equipment in a case that that a sounding reference signal (SRS) transmitted over a n'th subframe for a first carrier is partially overlapped with a physical uplink shared channel (PUSCH) transmitted over a (n+1)'th subframe for a second carrier, wherein a timing advance value of the second carrier is greater than a timing advance value of the first carrier and n is a positive integer; and
    dropping, by the user equipment, the SRS transmitted over the n'th subframe of the first carrier in responding to determining that the total transmission power of the overlapped area exceeds the maximum transmission power of the user equipment.

2. The method according to claim 1 further comprising allowing, by the user equipment, simultaneous transmission of: the SRS over the n'th subframe for the first carrier, and the PUSCH over the (n+1)'th subframe for the second carrier, when the total transmission power of the overlapped area does not exceed the maximum transmission power of the user equipment.

3. The method according to claim 1 further comprising obtaining power headroom.

4. The method according to claim 3, wherein obtaining a power headroom comprises subtracting, by the user equipment, uplink channel transmission power of the second carrier from the maximum transmission power of the user equipment.

5. A user equipment, comprising:
    a processor, and
    a non-transitory computer readable memory coupled with the processor having program instructions stored thereon which, when executed by the processor, cause the user equipment to
    determine whether a total transmission power of an overlapped area exceeds a maximum transmission power of the user equipment in a case that a sounding reference signal (SRS) transmitted over a n'th subframe for a first carrier is partially overlapped with a physical uplink shared channel (PUSCH) transmitted over a (n+1)'th subframe for a second carrier, wherein a timing advance value of the second carrier is greater than a timing advance value of the first carrier and n is a positive integer; and
    drop the SRS transmitted over the n'th subframe of the first carrier in responding to determining that the total transmission power of the overlapped area exceeds the maximum transmission power of the user equipment.

6. The user equipment according to claim 5, wherein when executed by the processor, the program instructions further cause the user equipment to:
    allow simultaneous transmission of: the SRS over the n'th subframe for the first carrier, and the PUSCH over the (n+1)'th subframe for the second carrier, when the total transmission power of the overlapped area does not exceed the maximum transmission power of the user equipment.

7. The user equipment according to claim 5, wherein when executed by the processor, the program instructions further cause the user equipment to:
    obtain power headroom.

8. The user equipment according to claim 7, wherein when executed by the processor for obtaining power headroom, the program instructions further cause the user equipment to:
subtract uplink channel transmission power of the second carrier from the maximum transmission power of the user equipment.

9. A computer program product comprising: a non-transitory computer-readable medium storing computer executable instructions that when executed by a processor cause the processor to:
determine whether a total transmission power of an overlapped area exceeds a maximum transmission power of a user equipment in a case that a sounding reference signal (SRS) transmitted over a n'th subframe for a first carrier is partially overlapped with a physical uplink shared channel (PUSCH) transmitted over a (n+1)'th subframe for a second carrier, wherein a timing advance value of the second carrier is greater than a timing advance value of the first carrier and n is a positive integer; and
drop the SRS transmitted over the n'th subframe of the first carrier in responding to determining that the total transmission power of the overlapped area exceeds the maximum transmission power of the user equipment.

10. The computer program product according to claim 9, wherein when executed by the processor, the computer executable instructions further cause the processor to:
allow simultaneous transmission of: the SRS over the n'th subframe for the first carrier, and the PUSCH over the (n+1)'th subframe for the second carrier, when the total transmission power of the overlapped area does not exceed the maximum transmission power of the user equipment.

11. The computer program product according to claim 9, wherein when executed by the processor, the computer executable instructions further cause the processor to:
obtain power headroom.

12. The computer program product according to claim 11, wherein when executed by the processor for obtaining power headroom, the computer executable instructions further cause the processor to:
subtract uplink channel transmission power of the second carrier from the maximum transmission power of the user equipment.

* * * * *